Nov. 23, 1965  E. W. KUTZSCHER ETAL  3,219,822
INFRARED SEARCH SYSTEM
Filed Sept. 1, 1961  4 Sheets-Sheet 1

INVENTORS.
EDGAR W. KUTZSCHER
DOMINIC AMARA
BY
Agent

INVENTORS.
EDGAR W. KUTZSCHER
DOMINIC AMARA

INVENTORS.
EDGAR W. KUTZSCHER
DOMINIC AMARA
BY
Agent

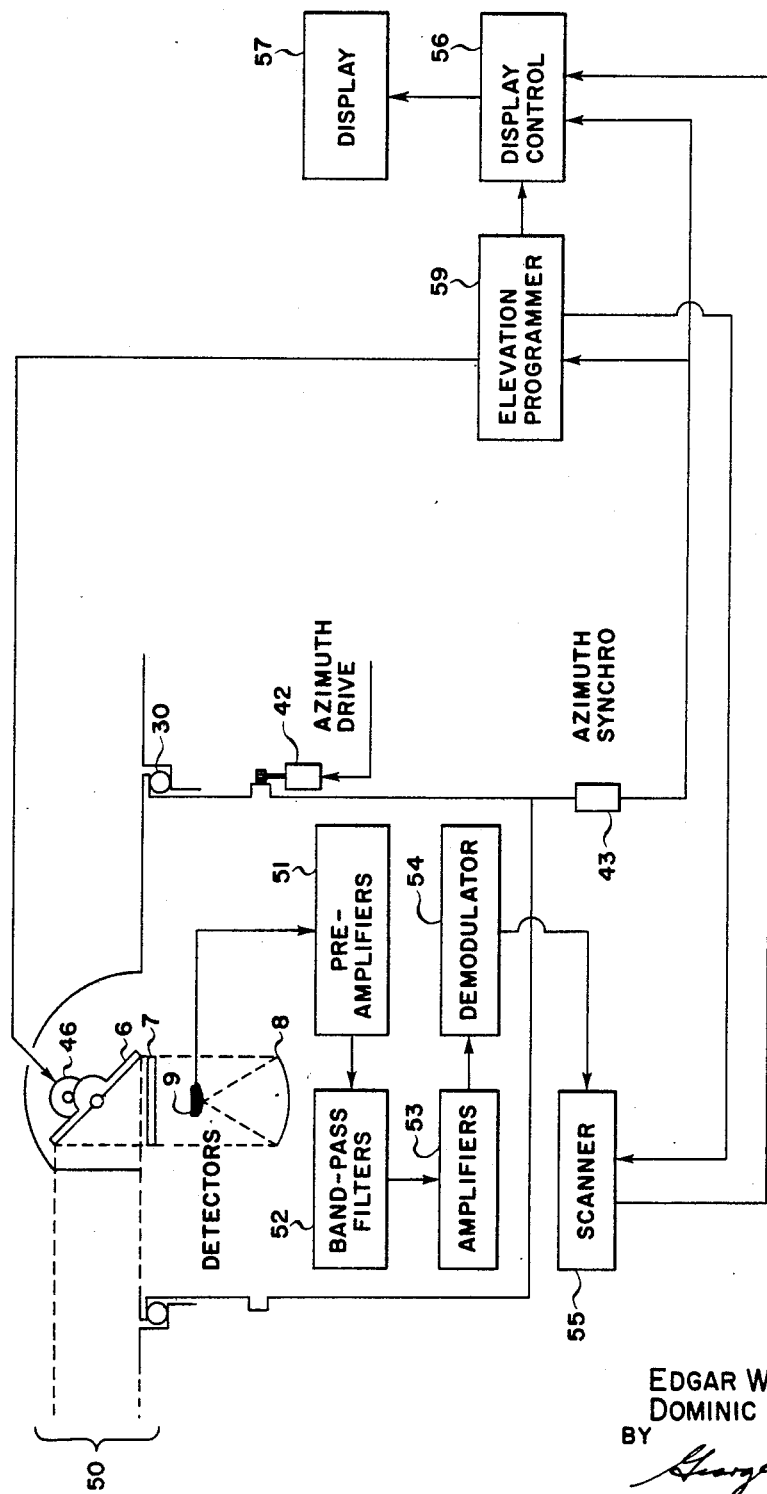

United States Patent Office 3,219,822
Patented Nov. 23, 1965

3,219,822
INFRARED SEARCH SYSTEM
Edgar W. Kutzscher and Dominic Amara, Sherman Oaks, Calif., assignors to Lockheed Aircraft Corporation, Burbank, Calif.
Filed Sept. 1, 1961, Ser. No. 146,671
7 Claims. (Cl. 250—83.3)

This invention relates to infrared search apparatus and more particularly to a ground-based search system suitable for scanning the sky to detect an infrared emissive target and measure its spatial location.

The infrared search system of the present invention provides accurate height finding and vector velocity prediction of acquired targets. The apparatus will detect a variety of infrared emissive targets such as aircraft and ballistic missiles.

The use of infrared techniques for detecting airplanes and missiles is superior to radar in that such techniques are entirely passive and thus, do not alert an enemy vehicle of his detection, and make active countermeasures even more difficult. Since modern high-speed aircraft utilize powerful engines emitting large amounts of infrared energy, effective shielding and cooling are extremely difficult. Also, infrared decoys impose a severe penalty to the enemy aircraft and are difficult to make effective. A further advantage of the infrared technique is that it permits detecting and tracking of low level attack airplanes, where radar is limited by ground clutter; an infrared search system is substantially immune to clutter. Being based on a passive method or target detection and tracking, it is almost impossible to jam infrared devices of the type disclosed hereinafter.

A further advantage of the infrared search system of the present invention over prior search systems is that infrared wave lengths are very short and it is therefore possible to obtain high angular accuracy with relatively small apertures. As compared with search systems which require a radiation transmitter, such as radar, the present equipment is smaller, simpler and requires less electrical power.

It is therefore a principal object of the invention to provide a novel and improved ground-based infrared searching and detection system for scanning a prescribed area to detect and acquire any infrared target which may enter the field of view of the apparatus.

Another object of the invention is to provide an automatic infrared search system for detecting airborne targets.

Still another object of the invention is to provide an airborne target detection system which is relatively immune to countermeasures and/or clutter.

A further object of the invention is to provide novel infrared scanning apparatus which will provide electrical output signals indicating the azimuth and elevation of an acquired infrared emissive target.

Still another object of the invention is to provide an infrared scanning system which will provide height and vector velocity data of an acquired target.

Yet another object of the invention is the improvement of infrared scanning apparatus generally.

Many other advantages, features and additional objects of the present invention will become mainfest to those versed in the art upon making reference to the detailed description and the accompanying sheets of drawings in which a preferred structural embodiment, incorporating the principles of the present invention is shown by way of illustrative example.

In the accompanying drawings:

FIGURE 5 is a block diagram of the apparatus of the invention; and

Figure 1:
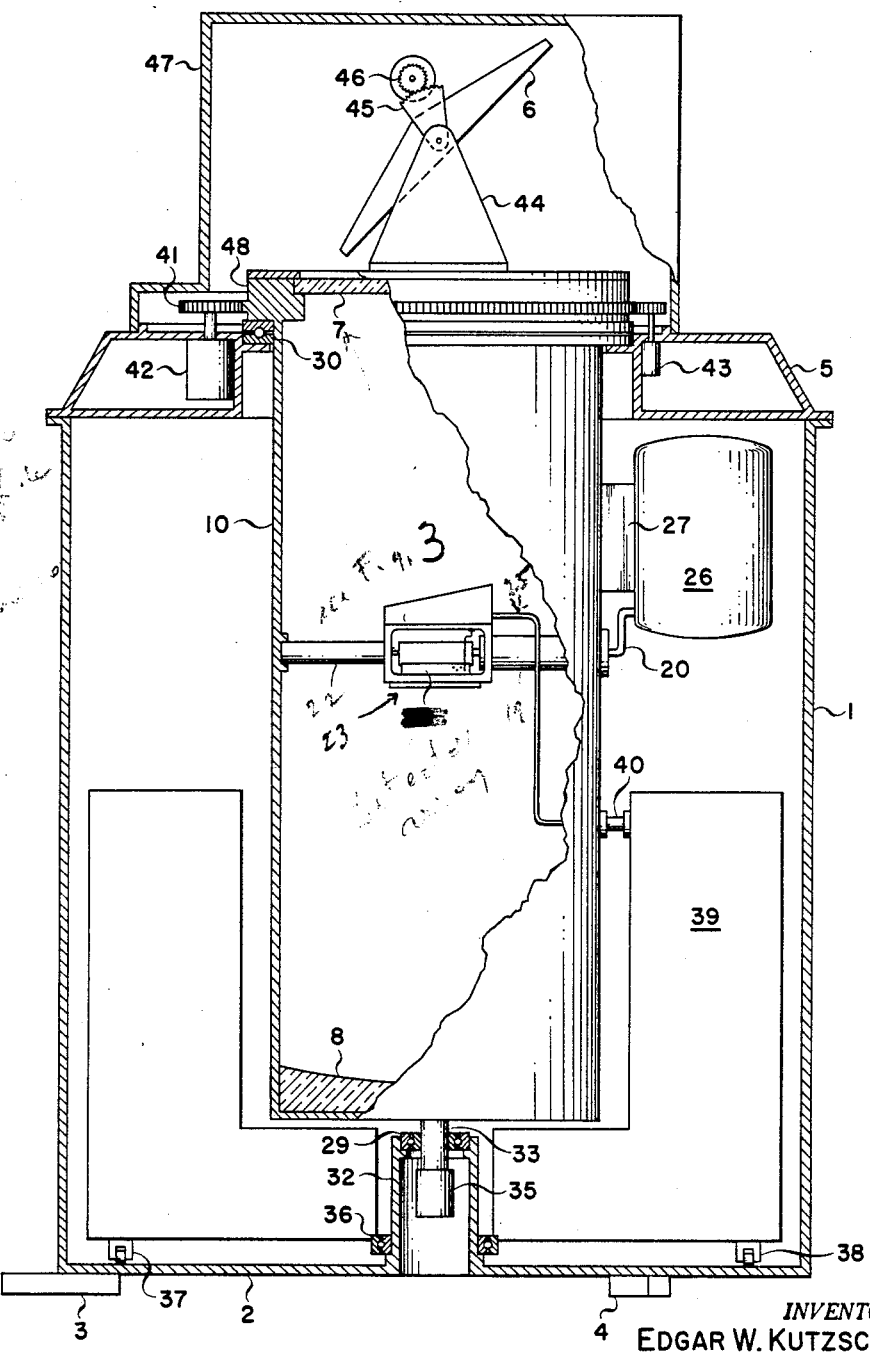
FIGURE 1 is an elevational view, partially in section.

Looking now at FIGURE 1, there is shown a preferred embodiment of the invention. The apparatus enclosure comprises a stationary cylindrical housing 1 which is closed on the bottom by base plate 2. The base plate 2 is supported by three mounting and leveling pads, two of which are shown at 3 and 4. The top of the stationary housing is partially enclosed by circular cover member 5.

A rotating head assembly receives radiation on a 45° elevation mirror 6 which deflects the infrared energy into a Schmidt optical system. Mirror 6 preferably has its first surface coated with a material which is highly reflective in the infrared spectrum. The Schmidt optical system comprises an aspheric corrector plate 7, primary mirror 8, and a field lens system. The Schmidt optical system is carried within inner housing 10 which is of cylindrical shape. The primary mirror 8 is mounted at the lower end of housing 10 and has a spheric concave first surface which is coated with a material which is highly reflective in the infrared spectrum. This mirror redirects the incoming beam upwards and focuses it on the detector cell array 9 which comprises a plurality of separate field lenses and detectors arranged in a compact array.

Figure 2:
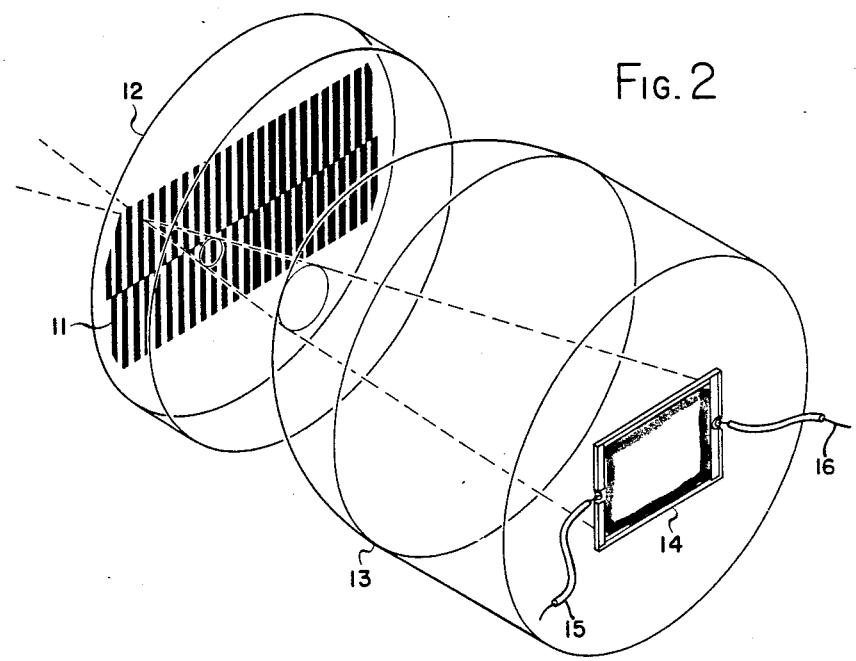
FIGURE 2 is a diagrammatic view of a typical infrared field lens and detector cell system.
Figure 4:
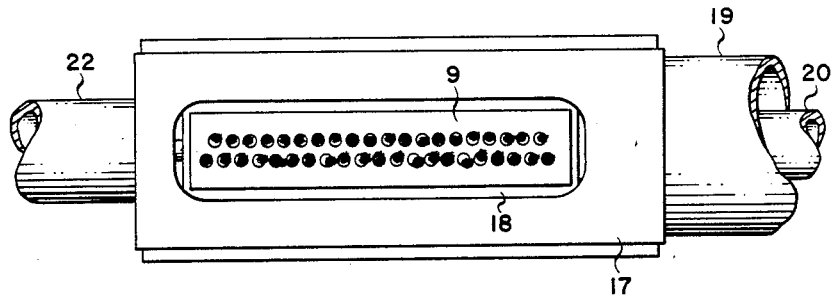
FIGURE 4 is a top plan view of the apparatus of FIGURE 3.

Looking now at FIGURE 2, there is shown a single field lens system of the type employed in detector array 9. In the present embodiment, a total of 41 detectors are representatively employed in the array; these detectors are arranged in two staggered rows as shown in FIGURE 4; the top row comprises 20 detectors and the bottom row comprises 21 detectors. The rows, being vertically staggered, permit overlap of the edges, eliminating dead zones between cells. This multiple detector array is shown and described in detail in co-pending application Serial No. 172,587 entitled, Coolable Multi-Infrared Detector Assembly, assigned to the same assignee as the assignee of the present invention.

Referring again to FIGURE 2, each field lens system comprises a first field lens 12 having an integral reticle pattern 11, and a second or rear element lens 13 which is directly coupled with an infrared detector cell 14. Infrared energy passing through the Schmidt corrector plate 7 onto the primary mirror 8 is focused onto the "picket fence" reticle pattern 11 which is located at the focal plane of the optical system. The use of field lenses permits the detectors to be uniformly illuminated regardless of the position of the image in the field of view.

A reticle pattern 11 comprises two staggered rows of opaque and transparent strips which are deposited directly onto the first surface of lens 12. The first field lens 12 is made from a material which is transparent to infrared radiation and has a suitable index of refraction. The second lens element 13 is also transparent to infrared energy and serves to collimate the beam passing through the reticle 11 onto detector cell 14. The detector cell comprises a material which is responsive to infrared energy and may be of the photoconductive type. The cell material is either deposited on a plate of suitable material cemented onto the rear surface of lens 13 or is immersed therein. Lead wires 15 and 16 connect cell 14 to related equipment as will be described more fully hereinafter. A total of 41 field lens and detector assemblies are combined into the detector array, which is then mounted within a Dewar flask to maintain the apparatus at a low temperature.

Figure 3:
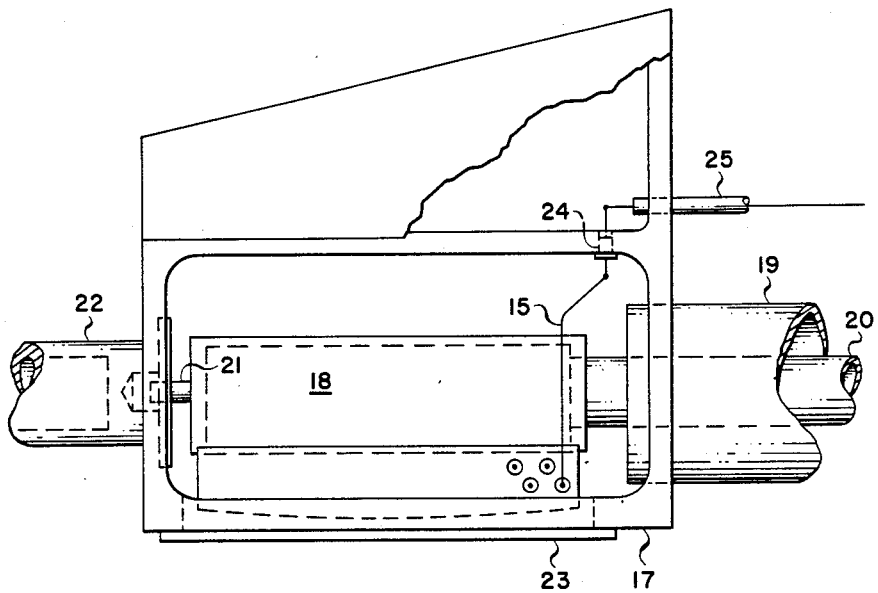
FIGURE 3 is a side elevation view partially in section of the detector cell array and Dewar housing.

Looking now at FIGURE 3, there is shown the construction of a specially designed Dewar flask for enclosing and cooling the detector cell array. Cooling of the reticle eliminates noise from reticle emission. The flask comprises outer container 17, which is hermetically sealed, and inner container 18 which may be filled with liquid nitrogen or other coolant. The inner container 18 of the vacuum flask contains the liquid cooling agent. The reticles, field lenses, and immersed detector cells are located in a special steel housing which is soldered to the inner container 18 of the Dewar flask assuring that all these elements will be at liquid nitrogen temperature. The void between outer container 17 and inner container 18 is evacuated through conduit 19, which also serves to support the flask assembly. The coolant is supplied under light pressure to the interior of container 18 via coolant line 20 which is located within conduit 19. The inner container is supported by line 20 and insulator 21. The flask is also supported by tubular brace 22 which is attached to the interior wall of housing 10. The flask has a suitable (for instance) barium fluoride window 23 in front of the sensitive array or scanning mosaic to assure that the infrared radiation will enter without appreciable energy attenuation due to absorption and reflection losses.

In case of a curved focal surface the individual elements are fitted to it. The angular field of view of the detector is limited by the cooled reticle aperture so that the detector is irradiated only by space radiation and not by the radiation emitted by the housing walls.

Lead wires from the cells, one of which is shown at 15 in FIGURE 3, pass through hermetically sealed headers 24 and thence to cable 25 which communicates with related equipment as will be described hereinafter.

The sub-assembly carried within the inner housing 10, includes the Schmidt optical system, the Dewar flask and field lens-detector array 9. Means are provided to adjust the Dewar flask so that the reticles are located precisely in the focal plane of the optical system. To maintain this position, the Dewar flask assembly is doweled to the housing. Coolant container 26 for supplying coolant to the Dewar flask is attached to the exterior of housing 10 by means of bracket 27. A small positive pressure is maintained in the coolant transfer system.

This sub-assembly is mounted for rotation by means of a pair of azimuth bearings 29 and 30. The upper azimuth bearing 30 is supported by cover member 5 and the lower azimuth bearing 29 is carried on ground base pedestal 32. Shaft 33 extends downward along the axis of rotation of housing 10 and turns within bearing 29. A portion of shaft 33 extends through bearing 29 and is provided with slip rings and brushes 35 through which electrical connections to the sub-assembly may be made.

An electronic package assembly 39, containing preamplifiers and data handling equipment, is supported on bearing 36 and rollers 37 and 38. The electronic package assembly rotates with the sub-assembly contained within housing 10. The data handling equipment contained within assembly 39 will be described in a subsequent section of this specification in connection with FIGURE 5. Electrical wiring may pass between the electronics package assembly 39 and the interior of housing 10 through conduit 40.

The upper end of housing 10 carries the receiver head assembly which is driven by gear 41 and azimuth drive motor 42. This will cause the elevation mirror 6 to be rotated at a constant angular rate which, for example, may be 54.7 degrees per second.

The receiver head assembly, in addition to elevation mirror 6, comprises mirror trunnion 44, elevation gear drive 45, and elevation drive motor 46. The elevation mirror 6 may be tilted 9° by the elevation drive motor 46 at the end of one revolution of the receiver head. Thus two adjacent 9° fields are alternately scanned to give a total elevation coverage of 18°.

The receiver head assembly may be covered by a weatherproof housing 47 to protect the mirror 6 and corrector plate 7 during non-operational periods.

The receiver head is carried on an aluminum ring 48 which is attached to one race of the azimuth bearing 30 and also serves as the mounting for the Schmidt corrector plate 7. The azimuth gear teeth are cut in the outer periphery of ring 48.

The corrector plate 7 may be fabricated from arsenic trisulfide, silicon, barium fluoride or other suitable material having a high transparency to infrared radiation, and a suitable index of refraction.

Figure 6:
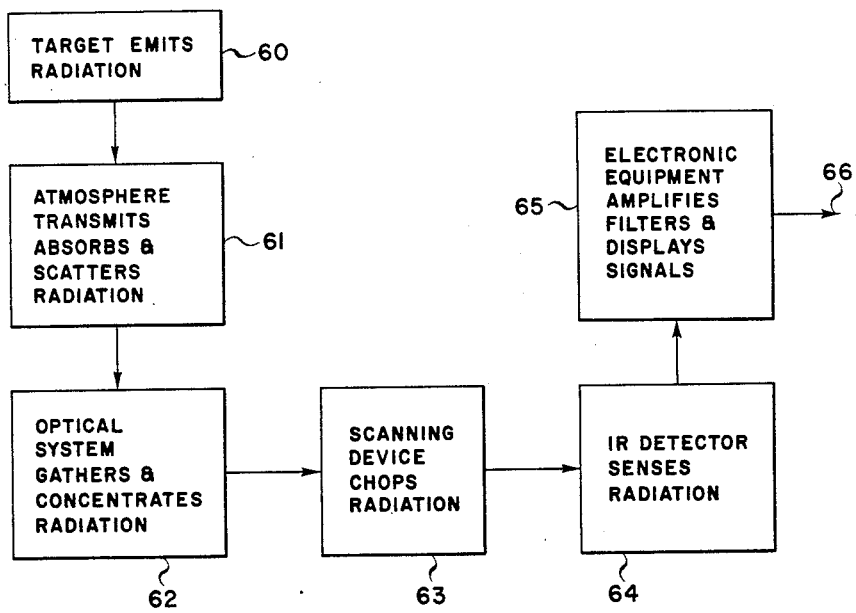
FIGURE 6 is a functional block diagram of the infrared detection system.

As the receiver head rotates through 360°, the array of infrared detectors, comprising the scanning mosaic, generates electrical signals in response to radiating targets in the field of view of the cell array. As shown in the functional block diagram of FIGURE 6, the target 60 emits radiation which is transmitted through the atmosphere 61 to the optical system 62. The atmosphere 61 tends to scatter and absorb part of the radiation emitted from the target. To increase the sensitivity of the device, the optical system 62 gathers a large area of radiation and concentrates it upon the detector array.

To provide a high degree of discrimination against background, spatial filtering in the form of a scanning reticle, which modulates the energy from a point source target but does not fully modulate the energy from an area target, such as cloud edges and horizons, is employed. Spatial filtering in the present invention is accomplished by means of the scanning reticles contained in the detector array. Reticle width is determined by the image quality of the optical system. It is desirable to use very narrow reticle openings to minimize the modulation of background energy. The scanning device 63 chops the incoming radiation from a point source at a fixed frequency as determined by the angular rate of rotation of the rotating receiver head in the optical system 62. The chopped or modulated infrared energy is sensed by a plurality of detectors 64 which generate a frequency signal in response to an incoming point source target image. The frequency signal is amplified, filtered and demodulated in the electronic equipment 65. The demodulated output is synchronized with azimuth and elevation output signals to provide an output 66 which may be visually displayed by any suitable and well-known display device, such as a cathode ray oscilloscope, and/or may be used to provide slewing signals to trackers or other related equipment.

The disclosure given up to this point is intended only to explain the fundamental optical arrangement of the instrument, without details of the electrical signal transmission or details of the mechanical features. Referring now to FIGURE 5, there is shown a block diagram of the structural elements for accomplishing the above-described functions. Radiant energy from the infrared emissive target enters the receiver head along optical path 50 and impinges upon elevation mirror 6. The reflected beam passes through aspheric corrector plate 7 and impinges upon primary mirror 8, which in turn, focusses the target image one detector cell array 9. The array of infrared sensitive detectors generate electrical signals in response to the presence of a point source target. The signals at the cells are the result of one or more infrared radiating targets in the field of view of the cell array. Infrared energy falling on each cell is interrupted (modulated) by a picket-fence reticle and the cell output is, therefore, a series of pulses.

A typical reticle consists of fourteen opaque lines separated by thirteen spaces, deposited on the first surface of the first field lens 12, a greater number, however, being representatively illustrated in FIGURE 2. The width of the reticle bars is determined by the limit of blur size capability, when considering thermal defocusing and vibration, of the optical system and in a typical embodiment, may be 0.080 millimeter wide, which is equivalent to approximately 40 seconds of arc if a focal length of about 40 centimeters is used. The reticle is 2 times 6 minutes high. This means that targets extending more than 300 feet at a distance of 250 nautical miles will not be fully modulated.

Due to the detector size, targets separated by approximately 2100 feet in elevation or by 3100 feet in azimuth at 100 nautical miles range are detected as separate targets.

The amount of radiation received by the detector from the background in the field of view is often much greater than the radiation from targets at a great distance. However, by taking advantage of the fact that the target is a point source, it is possible to discriminate against the background radiation by using a multiple detector array. Each detector "sees" only a small volume of space and the reticle subdivides this volume into a number of smaller elements approaching the minimum blur size of the optical system in the direction of scan. Thus, the background is modulated at a different frequency than the target. These fourteen reticle bars will produce a frequency of 2553 cycles per second, assuming that the elevation mirror is rotated at 54.7°/second in azimuth.

The field lens system is made to act as a spectral filter as well as being a substrate for the deposited metallic reticle pattern. This lens system is preferably fabricated from germanium and coated for optimum transmission in the desired spectral region. The output of each of the 41 detector cells in the array is amplified through a corresponding preamplifier 51, there being 41 channels. The output of each preamplifier is filtered through a corresponding band-pass filter 52 to remove noise.

The band-pass filters are tuned to the modulation frequency so that the target signal fundamental is passed and noise frequencies outside the pass-band are attenuated. The cell noise covers a wide frequency band and therefore filtering is necessary to achieve an optimum signal-to-noise ratio at the output.

Since the electronic system is designed to accept only energy at the frequency at which the target is modulated, it will respond to a small portion of the energy from the background. Once the scanning rate has been determined, the number of bars in the scanning reticle is chosen to optimize the operating frequency according to the time constant of the detector. As indicated previously in the present embodiment, a chopping frequency of 2553 cycles per second is selected. The band width of the electronic system is determined by the dwell time or the time the detector is irradiated by the target as it passes over the detector field of view. A narrow pass-band results in greater signal-to-noise ratio and better background discrimination. Consequently, systems are preferred in which the detector is irradiated for the full time the target is in the field of view. Since the energy pulse train envelope becomes almost flat in the latter portion of the dwell time, the signal-to-noise ratio can be improved by making the band width somewhat smaller than the theoretical value. A band width of 125 cycles per second is used in the present embodiment. The filtered signal in each channel is then amplified through amplifier 53 and demodulated by means of a corresponding channel in demodulator 54.

The preamplifiers will amplify the low-level signals (a few microvolts) from the detectors, and also serve as impedance matching devices to provide a relatively low-impedance output since the impedance of certain detector cells is typically of the order of a few megohms. The demodulated outputs from each of the 41 demodulators 54 are sequentially sampled by scanner 55 and transmitted to a display control 56. Demodulation extracts the envelope from the train of pulses caused by each target. The demodulated signals are sent through slip rings in the search instrument to a remote display console.

The electronic scanner 55 sequentially samples the 41 demodulator channels, each of which corresponds to 0.2 degree elevation. Thus, the time at which a signal passes the scanner corresponds to a particular elevation angle. Since the receiver head is rotating through 360° about the azimuth axis, the time of the signal occurrence represents both the azimuth and elevation positions of the target. The output of the display control 56 is visually presented on a display device 57, such as a cathode ray oscilloscope, in a manner resembling a radar plan position indicator display. That is, the azimuth line will swing around the center of the oscilloscope screen and the elevation angle will be represented by the radial distance from this center to the target indication.

The position of the receiver head in azimuth is sensed by azimuth synchro 43 and an azimuth position indicating signal is transmitted to the display control 56 in order to synchronize the display sweep with the instantaneous position of the receiving head. Elevation drive motor 46 tilts the receiver head 9° every other scan thereby providing a total angular coverage of 18° x 360°. The elevation motor 46 is controlled by the elevation programmer 59, which is synchronized with the scanner, to cyclically tilt the mirror 46.

Summerizing, to obtain the greatest sensitivity and therefore longest range with an infrared search device, the angular field of view of the detector must be restricted by the optical system so that the receiver is irradated only by the energy from the target of interest. As most military targets of interest represent point sources at useful ranges, the limit of the angular field of view of the detector is imposed by the image quality of the optical system. In the novel apparatus described hereinabove, a fixed scanning mosaic array is employed in which the detectors are arrayed in a line along one axis, and scanned along the opposite axis. A staggered reticle pattern is used in which the upper half and lower half of each reticle is only 0.1 degree in the vertical field, while the whole reticle covers vertically 0.2 degree.

Since both elevation and azimuth position signals are generated, the output may be combined with radar range information to permit accurate height finding and vector velocity predication. The output signals may also be used to slew an infrared tracker to a detected target for automatic tracking while the search system continues to scan the field. Other applications of the apparatus will be evident to those versed in the art.

From the foregoing, it will be apparent to those skilled in the art that there is provided by the present invention a novel and improved infrared search system for scanning a circular sector of the sky and providing a time-correlated output signal whereby distinction between a target signal and sky background can be achieved. Various modifications and alterations may be adopted by those skilled in the art without departing from the spirit and scope of the invention. For example, the search system has been described in conjunction with both reflective and refractive optics. This arrangement is convenient for sweeping the sky through 360° in azimuth and 18° in elevation and such design is preferred. It should be understood, however, that the invention can use any optics which will sweep the desired sky sector and focus the incoming radiation on the fixed detector array. The instrument of the present invention should, therefore, not be considered in its broader aspects to be limited to any particular kind of optical components. It is advantageous that the essential elements including the rotating mirror of the receiver head may be used with a wide variety of optics to permit the most effective design for any particular condition. Thus, it is intended that the disclosure be interpreted as illustrative of, rather than limiting upon, the invention as defined in the appended claims.

We claim:
1. An infrared search system comprising, receiver head means for imaging a beam from an infrared emissive target, drive means for rotating said head means about the azimuth axis, scanning mosaic means located in and fixed with respect to the image plane of said beam and responsive to the image of said target to provide a substantially fixed frequency output signal, fluid cooling means isolated from said image plane and adapted to cool said fixed scanning mosaic means, and demodulator means for scanning the mosaic means at the same rate as the rotation of the receiver head means and responsive to said frequency output signal to provide a demodulated signal corresponding to the instantaneous spatial position of said target.

2. An infrared search system as defined in claim 1 wherein said scanning mosaic means comprises a plurality of detector cells each of which is responsive to a separate portion of the image plane corresponding to separate increments of elevation angle.

3. An infrared search system comprising, an optical system for focusing an incoming beam of infrared energy from an emissive target onto an image plane, an elevation mirror for deflecting said incoming beam into said optical system, drive means for tilting said elevation mirror, azimuth drive means for rotating said elevation mirror through 360° in azimuth, scanning mosaic means fixed with respect to said image plane and having a plurality of detector cells responsive to infrared energy, said mosaic means being located in said image plane and having each detector cell responsive to a separate portion of an image in said image plane corresponding to separate increments of elevation angle, and electronic scanning means for sequentially sampling said detector cells to provide a time-correlated signal corresponding to the azimuth and elevation positions of said target.

4. An infrared search system as defined in claim 3 including display means responsive to said amizuth and elevation position signals for providing a visible display indicating the spatial position of said target.

5. In an infrared search system, scanning means comprising rotating optical means for sweeping a received image across an image plane, fixed scanning mosaic means located at said fixed image plane, fixed with respect thereto and including a plurality of mosaic elements, a plurality of detector cells responsive to infrared energy, the number of said cells corresponding to the number of said elements comprising said mosaic, and electronic scanner means for sequentially sampling said detector cells in synchronization with said rotating optical means for providing a time-correlated signal indicative of the azimuth and elevation position of said target.

6. Infrared search apparatus comprising, a stationary enclosure, a hollow cylindrical housing rotatably supported within said stationary enclosure, drive means supported by said stationary enclosure for rotating said cylindrical housing about the azimuth axis, receiver head means carried on the upper end of said cylindrical housing for deflecting incoming infrared radiation received from an emissive target downward into said cylindrical housing along the longitudinal axis thereof, optical means carried within said cylindrical housing for focusing said deflected energy onto an image plane, a detector cell array carried within said cylindrical housing, fixed with respect to and located at said image plane for receiving said deflected energy, and output means responsive to said detector cell array for providing time-correlated position signals representing the instantaneous spatial position of said emissive target.

7. A search system responsive to infrared energy emanating from a target for determining the azimuth and elevation angle of said target relative to said system, comprising detector means having a plurality of cells cooled indirectly by cryogenic means and being responsive to infrared energy to produce electrical output signals, optical means rotating in azimuth for directing energy from a target into substantial focus in a given image plane and thence onto said detector means, each said cell including a fixed reticle comprising alternate transparent and opaque lines disposed substantially in said image plane and fixed with respect thereto, the distance between said lines being substantially equal to the maximum dimension of the image of a point source target and the number of said lines being equal to the number of said cells, whereby upon rotation of said optical means said point source image will be modulated at a frequency proportional to the angular rate of rotation of said optical means, and demodulator means responsive to the frequency output generated by said detector means, in responsive to the incoming image of a point source target, for providing a demodulated signal indicative of the azimuth position of said target.

References Cited by the Examiner
UNITED STATES PATENTS

| | | | |
|---|---|---|---|
| 1,343,393 | 6/1920 | Hoffman | 250—83.3 |
| 2,334,085 | 11/1943 | Graves et al. | 250—83.3 |
| 2,454,841 | 11/1948 | Sackville | 250—83.3 |
| 2,920,205 | 1/1960 | Choyke | 250—83.3 |
| 2,958,802 | 11/1960 | Hammer et al. | 250—83.3 |
| 2,981,842 | 4/1961 | Kaufold et al. | 250—83.3 |
| 2,986,637 | 5/1961 | Null | 250—83.3 |
| 3,007,050 | 10/1961 | Green et al. | 250—83.3 |
| 3,011,058 | 11/1961 | Becker | 250—83.3 |
| 3,038,996 | 6/1962 | Grube | 250—83.3 |
| 3,087,986 | 4/1963 | De Brosse | 250—83.3 |
| 3,103,587 | 9/1963 | Ure et al. | 250—83.3 |
| 3,106,642 | 10/1963 | Shapiro | 250—203 X |

OTHER REFERENCES

Osborne: "Airborne Infrared Warning System Measures Range," Electronics, July 1, 1957, pp. 190 and 192.

RALPH G. NILSON, *Primary Examiner.*

ARCHIE BORCHELT, *Examiner.*